US 9,811,541 B2

(12) United States Patent
Revanuru et al.

(10) Patent No.: US 9,811,541 B2
(45) Date of Patent: Nov. 7, 2017

(54) SYSTEM AND METHOD FOR SUPPORTING LAZY DESERIALIZATION OF SESSION INFORMATION IN A SERVER CLUSTER (75) Inventors: Naresh Revanuru, Fremont, CA (US); Lenny Phan, Sunnyvale, CA (US); Scott Oaks, New York, NY (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 13/167,636

(22) Filed: Jun. 23, 2011

(65) Prior Publication Data
US 2012/0066394 A1 Mar. 15, 2012

Related U.S. Application Data (60) Provisional application No. 61/383,285, filed on Sep. 15, 2010, provisional application No. 61/384,227, filed on Sep. 17, 2010.

(51) Int. Cl.
*G06F 17/30* (2006.01)
*H04L 29/06* (2006.01)
(Continued)

(52) U.S. Cl.
CPC .. *G06F 17/30286* (2013.01); *G06F 15/17318* (2013.01); *G06F 17/30368* (2013.01);
(Continued)

(58) Field of Classification Search
CPC .......... H04L 67/10004; H04L 67/1095; H04L 67/1027; H04L 67/14
(Continued)

(56) References Cited

U.S. PATENT DOCUMENTS 5,109,384 A 4/1992 Tseung
5,333,274 A 7/1994 Amini
(Continued)

FOREIGN PATENT DOCUMENTS

CN 101159539 A 4/2008
CN 101408899 A 4/2009
(Continued)

OTHER PUBLICATIONS

Baldwin, The ByteBuffer Class in Java, Aug. 20, 2002, 14 pages. Retrieved from: developer.com.
(Continued)

*Primary Examiner* — Tom Y Chang
(74) *Attorney, Agent, or Firm* — Tucker Ellis LLP (57) ABSTRACT A system and method can support in-memory session replication in a server cluster using a lazy deserialization approach. The server cluster can include a primary application server and a secondary application server. The primary application server operates to receive a request associated with a session from a client and maintains session information associated with the session. Based on the session information, the primary application server can responds to the client. The secondary application server operates to receive and maintain serialized session information from the primary application server. The secondary application server operates to update the serialized session information based on one or more session updates received from the primary application server. When the primary application server fails, the secondary application server can generate deserialized session information based on the updated serialized session information and responds to the client.

20 Claims, 7 Drawing Sheets (51) Int. Cl.

| | | |
|---|---|---|
| *G06F 15/173* | (2006.01) | |
| *H04L 12/24* | (2006.01) | |
| *H04L 12/931* | (2013.01) | |
| *H04L 29/08* | (2006.01) | |
| *G06F 9/455* | (2006.01) | |

(52) U.S. Cl.
CPC .. *G06F 17/30584* (2013.01); *H04L 29/06088* (2013.01); *H04L 41/042* (2013.01); *H04L 41/0686* (2013.01); *H04L 49/358* (2013.01); *H04L 67/02* (2013.01); *H04L 67/10* (2013.01); *H04L 67/1002* (2013.01); *H04L 67/1034* (2013.01); *H04L 67/1095* (2013.01); *H04L 67/142* (2013.01); *H04L 67/146* (2013.01); *G06F 9/45504* (2013.01); *H04L 67/1004* (2013.01); *H04L 67/1027* (2013.01); *H04L 67/14* (2013.01)

(58) Field of Classification Search
USPC .......................................................... 709/226
See application file for complete search history.

(56) References Cited

U.S. PATENT DOCUMENTS

| | | | |
|---|---|---|---|
| 6,192,389 B1 | 2/2001 | Ault | |
| 6,427,161 B1 | 7/2002 | LiVecchi | |
| 6,466,965 B1 | 10/2002 | Chessell | |
| 6,895,590 B2 | 5/2005 | Yadav | |
| 6,938,085 B1 | 8/2005 | Belkin et al. | |
| 7,394,288 B1 | 7/2008 | Agarwal | |
| 7,554,993 B2 | 6/2009 | Modi et al. | |
| 7,765,307 B1 | 7/2010 | Kritov | |
| 7,831,731 B2 | 11/2010 | Tang | |
| 7,991,904 B2 | 8/2011 | Melnyk et al. | |
| 8,130,776 B1 | 3/2012 | Sundararajan | |
| 8,131,860 B1* | 3/2012 | Wong et al. | ............. 709/228 |
| 8,578,033 B2 | 11/2013 | Mallart | |
| 8,601,057 B2 | 12/2013 | Han | |
| 9,454,444 B1* | 9/2016 | Agarwal | ............. G06F 11/1425 |
| 2002/0097954 A1 | 7/2002 | Maeno | |
| 2002/0174136 A1 | 11/2002 | Cameron et al. | |
| 2003/0014480 A1 | 1/2003 | Pullara et al. | |
| 2003/0078958 A1 | 4/2003 | Pace et al. | |
| 2003/0088713 A1 | 5/2003 | Mandal | |
| 2003/0093499 A1 | 5/2003 | Messinger | |
| 2003/0110232 A1 | 6/2003 | Chen | |
| 2003/0120822 A1* | 6/2003 | Langrind et al. | ............. 709/251 |
| 2004/0177126 A1 | 9/2004 | Maine | |
| 2004/0205771 A1 | 10/2004 | Sudarshan et al. | |
| 2004/0225671 A1 | 11/2004 | Carroll | |
| 2005/0021354 A1 | 1/2005 | Brendle et al. | |
| 2005/0027901 A1 | 2/2005 | Simon | |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0223109 A1 | 10/2005 | Mamou | |
| 2005/0234986 A1* | 10/2005 | Terek | ............. G06F 17/30988 |
| 2005/0262215 A1* | 11/2005 | Kirov et al. | ............. 709/207 |
| 2006/0015600 A1 | 1/2006 | Piper | |
| 2006/0031846 A1* | 2/2006 | Jacobs | ............. G06F 9/465 |
| | | | 719/313 |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0248200 A1* | 11/2006 | Stanev | ............. 709/227 |
| 2006/0294417 A1 | 12/2006 | Awashi et al. | |
| 2007/0019868 A1 | 1/2007 | Takai et al. | |
| 2007/0058669 A1 | 3/2007 | Hofmann | |
| 2007/0156869 A1 | 7/2007 | Galchev | |
| 2007/0157212 A1 | 7/2007 | Berg | |
| 2007/0162559 A1 | 7/2007 | Biswas | |
| 2007/0174660 A1* | 7/2007 | Peddada | ............. H04L 41/0663 |
| | | | 714/4.1 |
| 2007/0174829 A1 | 7/2007 | Brockmeyer | |
| 2007/0198684 A1 | 8/2007 | Mizushima | |
| 2007/0203944 A1 | 8/2007 | Batra et al. | |
| 2007/0245005 A1 | 10/2007 | Banerjee | |
| 2008/0044141 A1 | 2/2008 | Willis et al. | |
| 2008/0098018 A1* | 4/2008 | King | ............. G06F 17/30961 |
| 2008/0098119 A1* | 4/2008 | Jindal | ............. H04L 67/02 |
| | | | 709/228 |
| 2008/0098458 A2 | 4/2008 | Smith | |
| 2008/0140844 A1 | 6/2008 | Halpern | |
| 2008/0163124 A1* | 7/2008 | Bonev et al. | ............. 715/853 |
| 2008/0195664 A1 | 8/2008 | Maharajh | |
| 2008/0286741 A1* | 11/2008 | Call | ............. 434/350 |
| 2008/0304423 A1 | 12/2008 | Chuang | |
| 2008/0316977 A1 | 12/2008 | Malladi | |
| 2009/0019158 A1* | 1/2009 | Langen et al. | ............. 709/226 |
| 2009/0024764 A1 | 1/2009 | Atherton | |
| 2009/0034537 A1 | 2/2009 | Colrain et al. | |
| 2009/0063734 A1 | 3/2009 | Kurata | |
| 2009/0103504 A1 | 4/2009 | Inumaru | |
| 2009/0150647 A1 | 6/2009 | Mejdrich et al. | |
| 2009/0172636 A1 | 7/2009 | Griffith | |
| 2009/0182642 A1 | 7/2009 | Sandaresan | |
| 2009/0327471 A1* | 12/2009 | Astete et al. | ............. 709/223 |
| 2010/0138208 A1 | 6/2010 | Hattori | |
| 2010/0138531 A1 | 6/2010 | Kashyap | |
| 2010/0198920 A1 | 8/2010 | Wong | |
| 2010/0199259 A1 | 8/2010 | Quinn et al. | |
| 2011/0016123 A1 | 1/2011 | Pandey | |
| 2011/0022694 A1 | 1/2011 | Dalal et al. | |
| 2011/0022882 A1* | 1/2011 | Jaehde | ............. G06F 11/2023 |
| | | | 714/4.1 |
| 2011/0029812 A1* | 2/2011 | Lu | ............. G06F 11/1474 |
| | | | 714/18 |
| 2011/0047413 A1* | 2/2011 | McGill | ............. G06F 11/1662 |
| | | | 714/15 |
| 2011/0055510 A1 | 3/2011 | Fritz et al. | |
| 2011/0066737 A1 | 3/2011 | Mallart | |
| 2011/0071981 A1 | 3/2011 | Ghosh et al. | |
| 2011/0082832 A1* | 4/2011 | Vadali | ............. G06F 11/1451 |
| | | | 707/615 |
| 2011/0119673 A1 | 5/2011 | Bloch | |
| 2011/0161457 A1 | 6/2011 | Sentinelli | |
| 2011/0185021 A1 | 7/2011 | Han | |
| 2011/0228668 A1 | 9/2011 | Pillai et al. | |
| 2011/0246582 A1 | 10/2011 | Dozsa | |
| 2012/0023557 A1 | 1/2012 | Bevan | |
| 2012/0066400 A1 | 3/2012 | Reynolds | |
| 2012/0066460 A1 | 3/2012 | Bihani | |
| 2012/0131330 A1 | 5/2012 | Tonsing | |
| 2012/0144045 A1 | 6/2012 | Revanuru | |
| 2012/0203986 A1 | 8/2012 | Strasser | |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0014118 A1 | 1/2013 | Jones | |
| 2014/0059226 A1 | 2/2014 | Messerli | |

FOREIGN PATENT DOCUMENTS

| | | |
|---|---|---|
| CN | 101661499 A | 3/2010 |
| JP | 2000-339287 | 12/2000 |
| JP | 2003196229 | 7/2003 |
| JP | 2007-226398 | 9/2007 |
| WO | 2006046972 | 5/2006 |

OTHER PUBLICATIONS

Anonymous, What is Scatter-Gather DMA (Direct Memory Access)?, Jul. 22, 2010, 2 pages.
Pfister, An Introduction to the InfiniBand Architecture, High Performance Mass Storage and Parallel I/O, 2002, 617-632.
International Searching Authority, International Search Report and Written Opinion for PCT International Application No. PCT/US2011/051697, dated Dec. 6, 2011, 10 pages.

(56) References Cited

OTHER PUBLICATIONS

International Searching Authority, International Search Report and Written Opinion for PCT International Application No. PCT/US2011/051459, dated Dec. 6, 2011, 8 pages.
International Searching Authority at the European Patent Office, International Search Report and Written Opinion for PCT International Patent Application PCT/US2013/067286, dated Feb. 5, 2014, 10 pages.
State Intellectual Property Office of the People's Republic of China Search Report dated Dec. 15, 2015 for Chinese Application No. 201180039809.X, 2 pages.
State Intellectual Property Office of the People's Republic of China Search Report dated Dec. 18, 2015 for Chinese Application No. 201180039804.7, 2 pages.
European Patent Office, Examining Division, Examination Report dated November 16, 2016 for European Patent Application No. 13789928.2, 8 Pages.
United States Patent and Trademark Office, Office Action dated Jun. 15, 2017 for U.S. Appl. No. 13/170,490, 27 Pages.
Informatica®, Informatica Powerchannel User Guide, Version 9.5.1, Dec. 2012, Copyright © 1998-2012 Informatica, 151 Pages.
European Patent Office, Substantive Examination Report dated May 29, 2017 for European Application No. 13789928.2, 10 Pages.
United States Patent and Trademark Office, Notice of Allowance and Fee(S) Due Dated Sep. 7, 2017 for U.S. Appl. No. 13/170,490, 27 pages.

* cited by examiner

SYSTEM AND METHOD FOR SUPPORTING LAZY DESERIALIZATION OF SESSION INFORMATION IN A SERVER CLUSTER

CLAIM OF PRIORITY

This application claims the benefit of priority on U.S. Provisional Patent Application No. 61/383,285, entitled "MIDDLEWARE MACHINE PLATFORM", filed Sep. 15, 2010; and U.S. Provisional Patent Application No. 61/384,227, entitled "MIDDLEWARE MACHINE PLATFORM", filed Sep. 17, 2010, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for providing a middleware machine or similar platform.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the generally areas that embodiments of the invention are intended to address.

SUMMARY

Described herein is a system and method for providing a middleware machine or similar platform. In accordance with an embodiment the system (referred to herein in some implementations as "Exalogic") comprises a combination of high performance hardware, together with an application server or middleware environment, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InifiniBand network, which support the execution of an application server, middleware or other functionality such as, for example, WebLogic Server, JRockit JVM, Oracle Linux, and Oracle VM. Additional features of the system can include, e.g. Zero Buffer Copies, Scatter/Gather I/O, T3 Connections, Lazy Deserialization, and GridLink DataSource.

In accordance with an embodiment, a system and method can support in-memory session replication in a server cluster using a lazy deserialization approach. The server cluster can include a primary application server and a secondary application server. The primary application server operates to receive a request associated with a session from a client and maintains session information associated with the session. Based on the session information, the primary application server can respond to the client. The secondary application server operates to receive and maintain serialized session information from the primary application server. The secondary application server operates to update the serialized session information based on one or more session updates received from the primary application server. When the primary application server fails, the secondary application server can generate deserialized session information based on the updated serialized session information and responds to the client.

DETAILED DESCRIPTION

As described above, within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments.

To address this, described herein is a system and method for providing a middleware machine or similar platform. In accordance with an embodiment the system (referred to herein in some implementations as "Exalogic") comprises a combination of high performance hardware, e.g. 64-bit processor technology, high performance large memory, and redundant InfiniBand and Ethernet networking; together with an application server or middleware environment, such as WebLogic Suite, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InifiniBand network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, InfiniBand switch gateway, and storage nodes or units, communicating with one another via an InfiniBand network.

Figure 1:
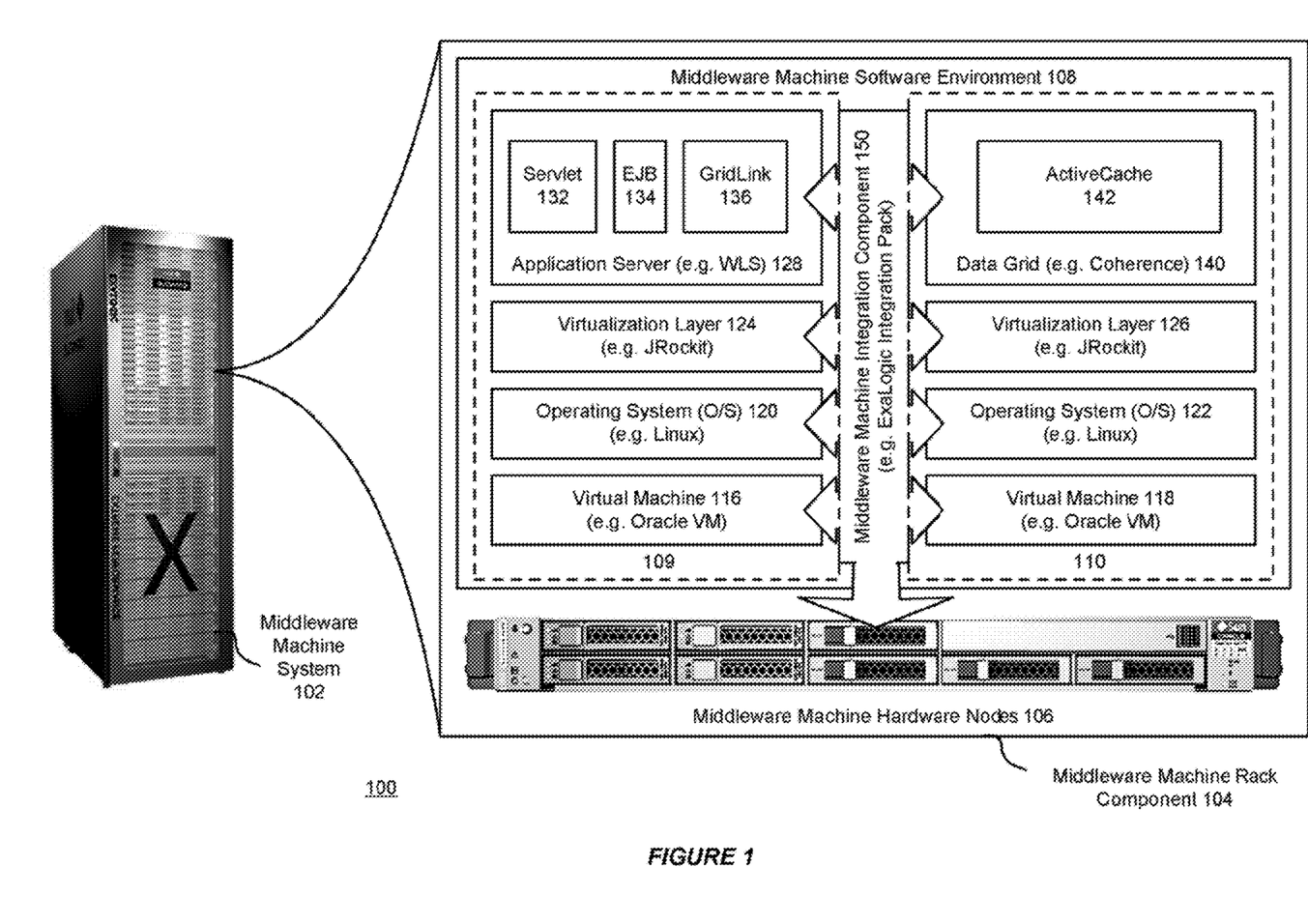
FIG. 1 shows an illustration of a middleware machine environment in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
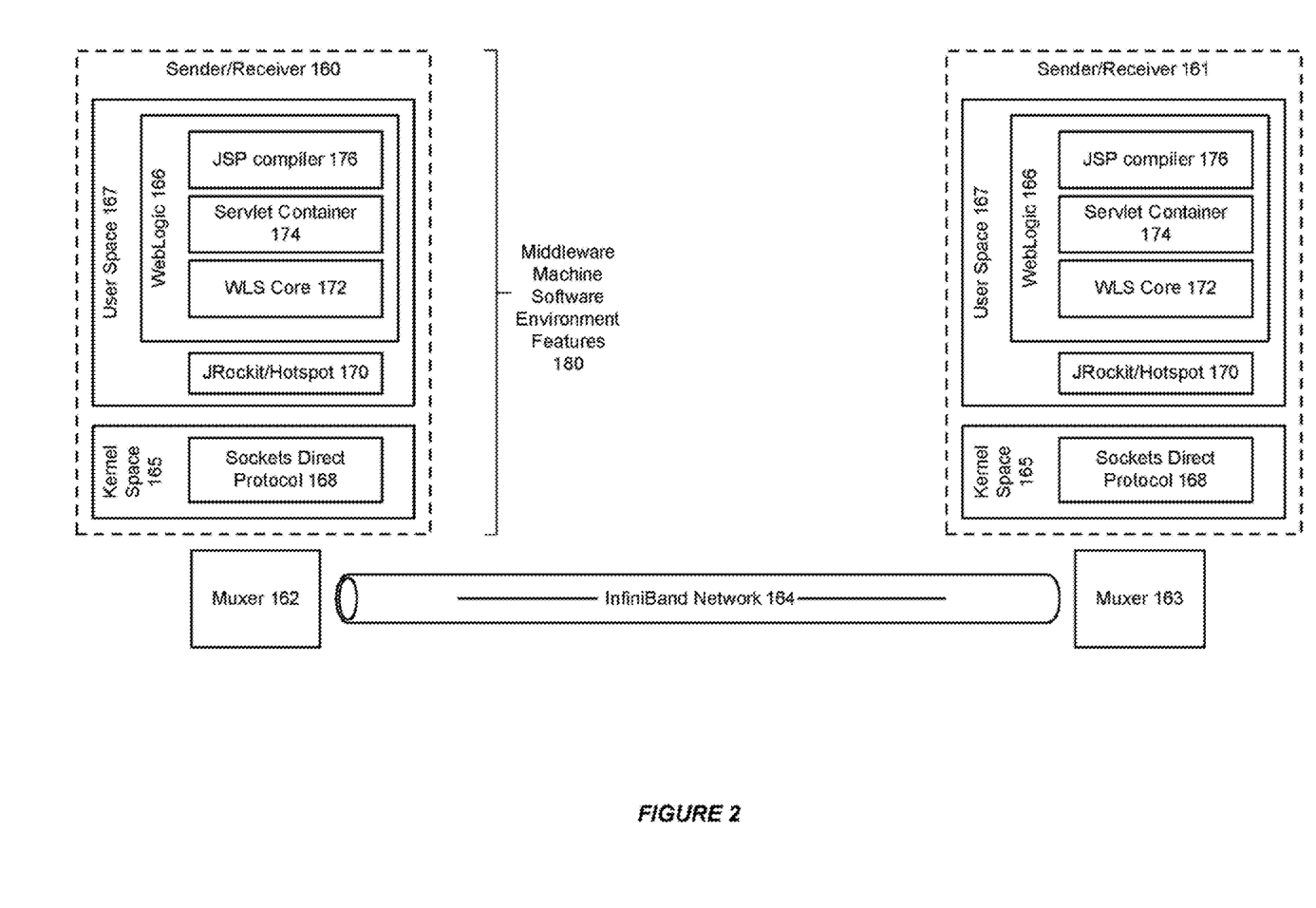
FIG. 2 shows another illustration of a middleware machine platform or environment in accordance with an embodiment.

FIG. 2 shows another illustration of a middleware machine platform or environment 180, in accordance with an embodiment. As shown in FIG. 2, each application server instance can act as a sender and/or receiver 160, 161 within the middleware machine environment. Each application server instance is also associated with a muxer 162, 163, that allows application servers to communicate with one another via an InfiniBand network 164. In the example shown in FIG. 2, an application server instance can include a kernel space 165, user space 167, and application server (e.g. WebLogic space) 166, which in turn can include a sockets direct protocol 168, JVM (e.g. JRockit/Hotspot layer) 170, WLS core 172, servlet container 174, and JSP compiler 176. In accordance with other examples, other combinations of middleware-type software can be included. In accordance with various embodiments, the machine integration component can provide features such as Zero Buffer Copies, Scatter/Gather I/O, T3 Connections, Lazy Deserialization, and GridLink DataSource, to provide the basis for, and improve performance within, the shared infrastructure.

In accordance with one embodiment, the system can support in-memory session replication in a server cluster using a lazy deserialization approach. A middleware machine platform or environment can include one or more clusters of application servers. The system is able to recover from service failures, so that the middleware machine platform can provide high availability. In accordance with an embodiment, session state is used in the middleware machine platform for storing important user session information. The system can use different methods for replicating the session state associated with the user service request across clusters, such as in-memory replication and JDBC-based persistence. Using in-memory replication, the system copies a session state from one server instance to another. The primary application server creates a primary session state on the server to which the client first connects, and a secondary replica on another server instance in the cluster. The replica is kept up-to-date so that it can be used if the primary application server, for example the server that hosts the servlet, fails. In JDBC-based persistence, the system maintains a session state, for example the session state of a servlet or JSP, using file-based or JDBC-based persistence. JDBC-based persistence is also used for session state replication within a Wide Area Network (WAN).

In accordance with an embodiment, the system can perform a serialization step to convert the primary session data for data transmission. The serialization step is a process of converting a complex data structure, such as a parallel arrangement of data, into a serial form. The parallel arrangement of data transmits a number of bits at a time along parallel channels, while the serial form transmits one bit at a time. Serializing session data introduces some overhead for replicating the session state. The overhead increases as the size of serialized objects grows. For example, if a user plans to create very large objects in a HTTP session, the performance of a servlets may need to be tested to ensure that performance is acceptable.

In accordance with an embodiment, to support in-memory replication for a session, session states need to be serializable. Every field in an object needs to be serializable or transient in order for the object to be considered serializable. For example, all servlet and JSP session data in HTTP session states need to be serializable. If the servlet or JSP uses a combination of serializable and non-serializable objects, the system may not replicate the session state of the non-serializable objects.

In accordance with an embodiment, a session state can be altered using functions provided by the system. For example, a special function HttpSession.setAttribute ( ) can be used to change attributes in a session object in an HTTP servlet that implements javax.servlet.http.HttpSession. If a user set attributes in a session object with setAttribute, the object and its attributes are replicated in a cluster using in-memory replication. If the user uses other set methods to change objects within a session, the system may not replicate those changes. Every time a change is made to an object that is in a session, setAttribute( ) can be called to update that object across the cluster. Likewise, removeAttribute( ) can be used to remove an attribute from a session object.

Figure 3:
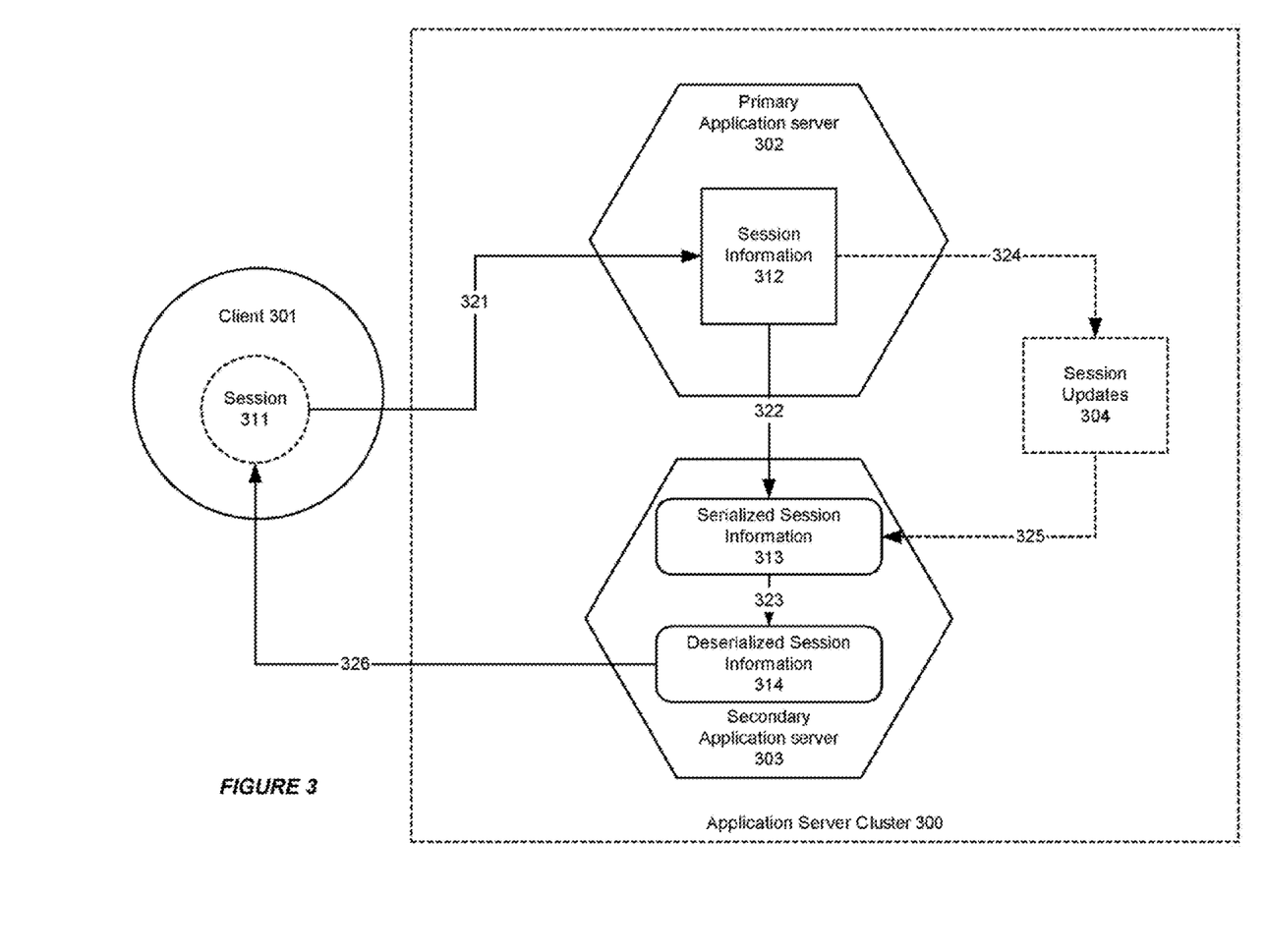
FIG. 3 shows an illustration of a system to support in-memory session replication in a server cluster in accordance with an embodiment.

FIG. 3 shows an illustration of a system to support in-memory session replication in a server cluster in accordance with an embodiment. As shown in FIG. 3, a client 301 can interact with a server cluster 300 that includes a primary application server 302 and a secondary application server 303. The primary application server operates to receive a request associated with a session 311 from the client at step 321, and maintains session information 312 associated with the session. The primary application server can also respond to the client based on the session information. Furthermore, the secondary application server operates to receive and maintain serialized session information 313 from the primary application server at step 322.

In accordance with an embodiment, during the interaction between the client and the primary application server, the session information maintained on the primary application server can be changed at step 324. At runtime, the primary application server can send these session updates 304 to the secondary application server at step 325. And, the secondary application server operates to update the stored serialized session information based on the session updates received from the primary application server.

In accordance with one embodiment, the serialized session data can be stored in a binary format, for example as byte arrays, in the secondary application server. The system can apply different logics for updating the binary serialized session data efficiently. In one embodiment, the system detects the entries in the byte arrays in the secondary application server that are affected by a particular session update. The system can then update the affected entries in the byte arrays directly without the need to replace the whole serialized session data in the byte arrays. This is particularly useful when the stored serialized session data are large in size.

In accordance with an embodiment, when the primary application server fails, the secondary application server operates to generate deserialized session information 314 based on the updated serialized session information at step 323. The secondary application server, or another application server in the middleware environment, can use the deserialized session information 314 and respond to the client at step 326.

In accordance with one embodiment, the system can optimize the in-memory session replication process by performing the deserialization step only when the primary application server fails. The optimization prevents the deserialization operation when primary application server is alive. With such optimization, the system can avoid taking a serialization step in the primary application server and a deserialization step in the secondary application server for every session update, which is expensive in terms of CPU utilization cost and latency overhead, especially when there are frequently session updates.

In accordance with an embodiment, a user can further control where secondary states are placed using replication groups. A replication group is a preferred list of clustered servers to be used for storing session state replicas. A user can assign the server to a replication group, and a preferred secondary replication group for hosting the serialized replica of the primary HTTP session states created on the server. When a client attaches to a server in the cluster and creates a primary session state, the server hosting the primary state ranks other servers in the cluster to determine which server should host the secondary. Server ranks are assigned using a combination of the server's location (whether or not it resides on the same machine as the primary application server) and its participation in the primary application server's preferred replication group.

Figure 4:
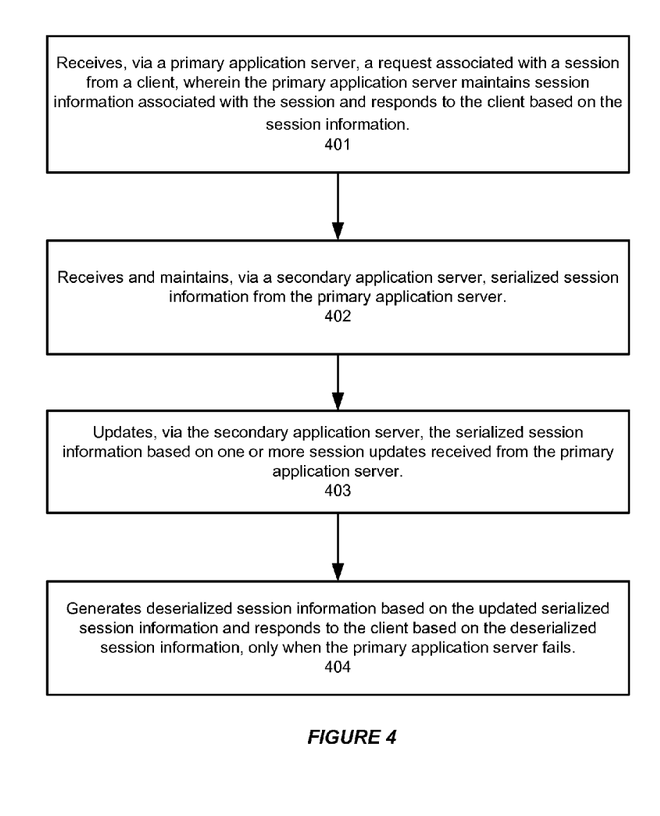
FIG. 4 illustrates an exemplary flow chart for supporting in-memory session replication in a server cluster in accordance with an embodiment.

FIG. 4 illustrates an exemplary flow chart for supporting in-memory session replication in a server cluster in accordance with an embodiment. As shown in FIG. 4, a primary application server receives a request associated with a session from a client at step 401. The primary application server also maintains session information associated with the session and responds to the client based on the session information. Then, a secondary application server can receive and maintain serialized session information from the primary application server at step 402. The secondary application server can further update the serialized session information based on one or more session updates received from the primary application server at step 403. Finally, only when the primary application server fails, the updated serialized session information can be deserialized and an application server can respond to the client based on the deserialized session information.

HTTP Session Replication

In order to support automatic replication and failover for servlets and JSPs within a cluster, the system can support two mechanisms for preserving HTTP session state: hardware load balancers and proxy plug-ins.

In accordance with one embodiment, a load balancing hardware can simply redirect client requests to any available server in the application server cluster, when a primary application server fails. The cluster can obtain the replica of the client's HTTP session state from a secondary application server in the cluster.

Figure 5:
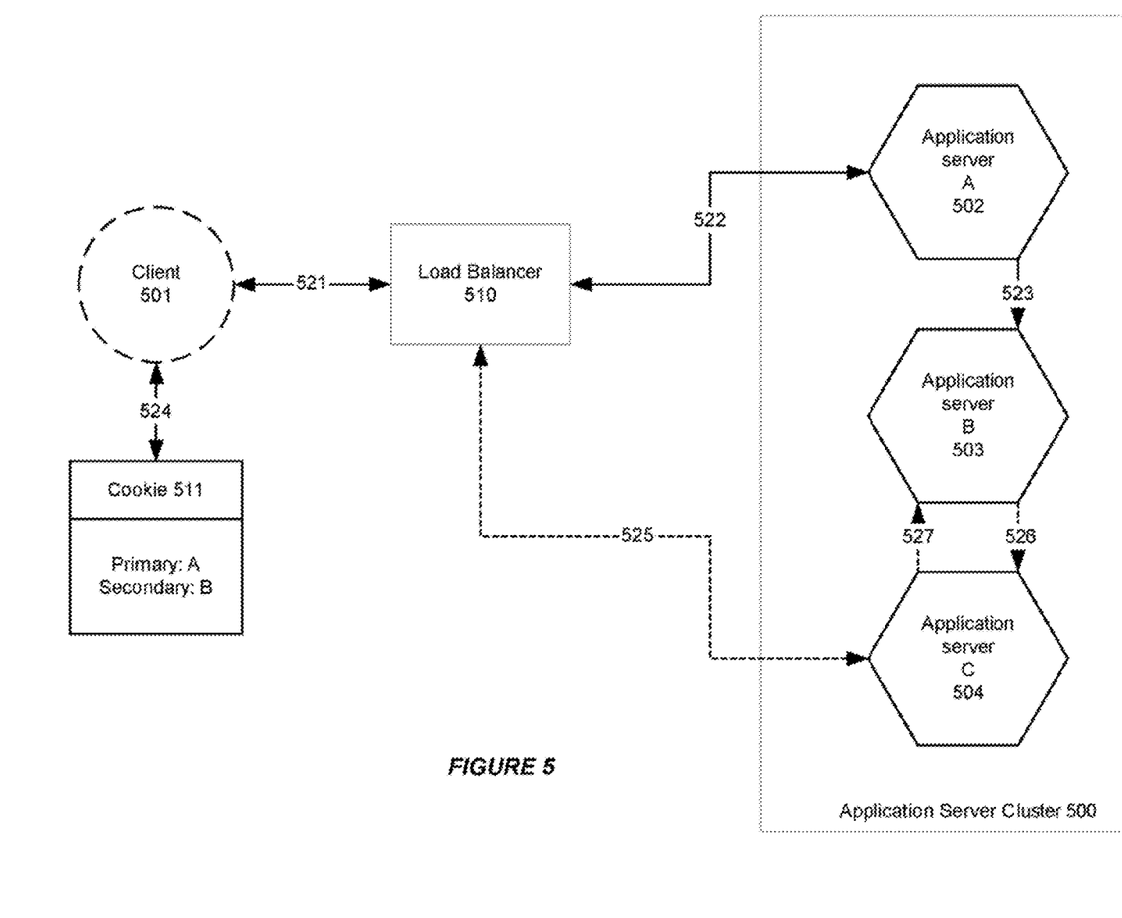
FIG. 5 shows an illustration of a system to support in-memory session replication in a server cluster using a load balancer in accordance with an embodiment.

FIG. 5 shows an illustration of a system to support in-memory session replication in a server cluster using a load balancer in accordance with an embodiment. As shown in FIG. 5, when a client 501 of a web application requests a servlet using a public IP address at step 521, a load balancer 510 routes the client's connection request to an application server cluster 500 in accordance with its configured policies. The system directs the request to an application server A 502, which acts as the primary host of the client's servlet session state at step 522. The system can use a ranking system to select a secondary application server B 503 to host the serialized session state associates with the session at step 523.

The client can record the location of both application server instances A and B in a local cookie 511 at step 524. If the client does not allow cookies, the record of the primary and secondary application servers can be recorded in the URL returned to the client via URL rewriting.

As the client makes additional requests to the cluster, the load balancer uses an identifier in the client-side cookie to ensure that those requests continue to go to the application server A, rather than being load-balanced to another server in the cluster. This ensures that the client remains associated with the server hosting the primary session object for the life of the session.

In response to a connection failure, the load balancing hardware uses its configured policies to direct the request to an available server in the cluster at step 525. In the above example, assuming that the load balancer routes the client's request to an application server C 504 after server A fails. When the client connects to server C, the server uses the information in the client's cookie, or the information in the HTTP request if URL rewriting is used, to connect to server B. The application server C can further acquire the session state through deserializing the serialized session state on server B at step 526. The failover process remains completely transparent to the client. The deserialization step only needs to be performed once after a connection failure. Server C becomes the new host for the client's primary session state, and server B continues to host the serialized session state and receive session updates from server C at step 527. This new information about the primary and secondary host is again updated in the client's cookie, or via URL rewriting.

In accordance with one embodiment, an application server proxy plug-in maintains a list of application server instances that host a clustered servlet or JSP, and forwards HTTP requests to those instances using a round-robin strategy. The plug-in also provides the logic necessary to locate the serialized replica of a client's HTTP session state if an application server instance fails.

Figure 6:
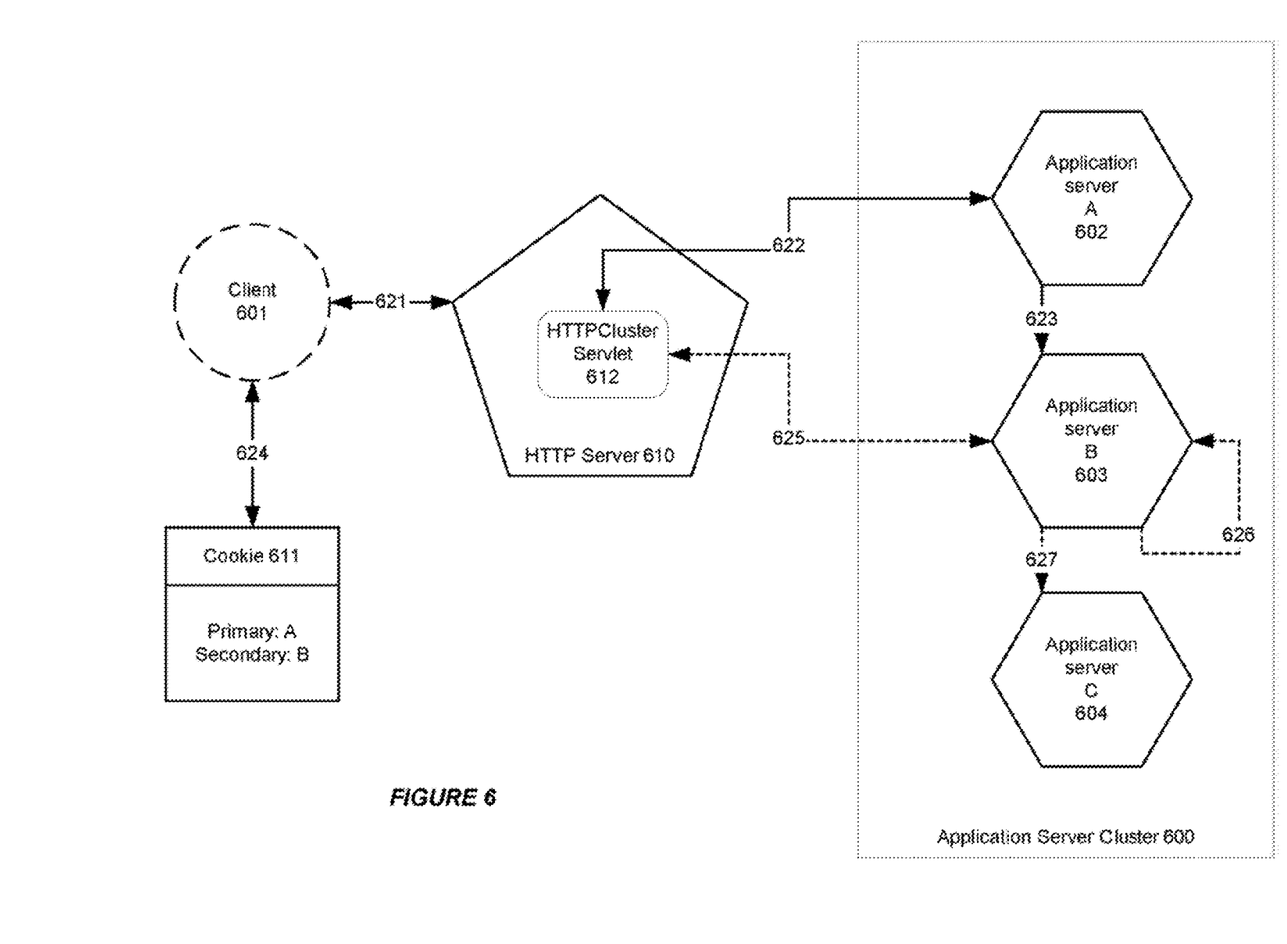
FIG. 6 shows an illustration of a system to support in-memory session replication in a server cluster using a proxy plug-in in accordance with an embodiment.

FIG. 6 shows an illustration of a system to support in-memory session replication in a server cluster using a proxy plug-in in accordance with an embodiment. As shown in FIG. 6, when a HTTP client 601 requests a servlet at step 621, a HttpClusterServlet 612 on a HTTP server 610 proxies the request to the application server cluster 600. The HttpClusterServlet maintains the list of all servers in the cluster, and the load balancing logic to use when accessing the cluster. In the above example, the HttpClusterServlet can route the client request to the servlet hosted on an application server A 602, which becomes the primary application server hosting the client's servlet session at step 622.

To provide failover services for the servlet, the primary application server transmits the serialized client's servlet session state to a secondary application server in the cluster at step 622. In the example above, application server B 603 is selected as the secondary application server at step 623.

The servlet page can be returned to the client through the HttpClusterServlet, and the client browser is instructed to write a cookie 611 that lists the primary and secondary locations of the servlet session state at step 624. If the client browser does not support cookies, the application server can use URL rewriting instead.

When the primary application server A fails, HttpClusterServlet can use the client's cookie information to determine the location of the secondary application server that hosts the replica of the session state. HttpClusterServlet can automatically redirect the client's next HTTP request to the secondary application server at step 625. The failover is transparent to the client, and server B can deserialize the serialized session state and acquire the session state at step 626.

After the failure, server B becomes the primary application server hosting the servlet session state, and a new secondary can be created on, for example, an application server C 604. Server C can then host the serialized session state and receive session updates from server B at step 627. In the HTTP response, the proxy updates the client's cookie to reflect the new primary and secondary application servers, to account for the possibility of subsequent failovers.

Cross-Cluster Session Replication

In accordance with one embodiment, in addition to providing HTTP session state replication across servers within a cluster, an application server provides the ability to replicate HTTP session state across multiple clusters. This improves high-availability and fault tolerance by allowing clusters to be spread across multiple geographic regions, power grids, and internet service providers.

Figure 7:
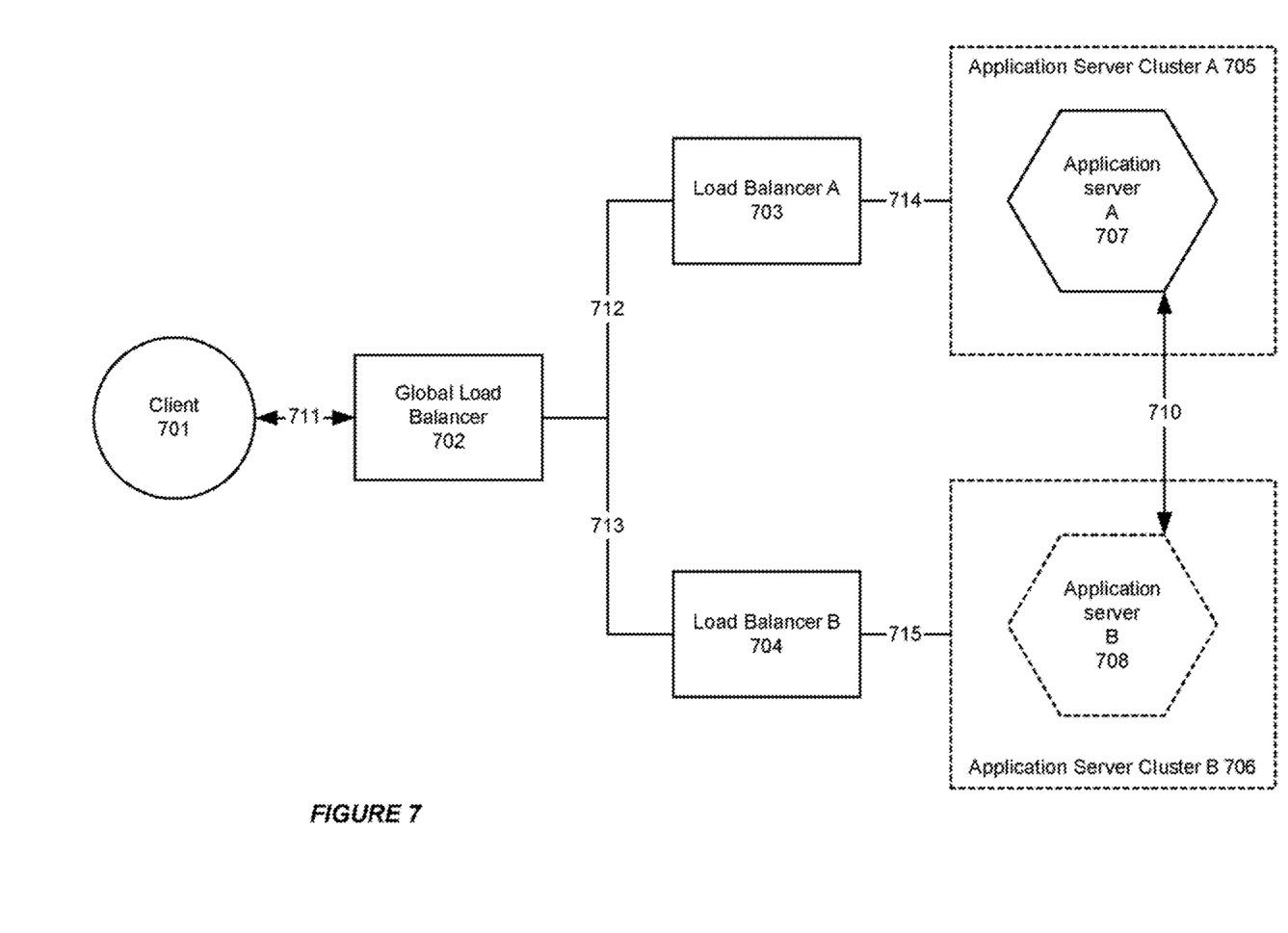
FIG. 7 shows an illustration of a system to support in-memory session replication cross server clusters in accordance with an embodiment.

FIG. 7 shows an illustration of a system to support in-memory session replication cross server clusters in accordance with an embodiment. As shown in FIG. 7, in a network configuration that supports cross-cluster replication, a global load balancer 702 is responsible for balancing HTTP requests across clusters 705 and 706. When a request comes in from a client 701 at step 711, the global load balancer determines which cluster to send it to based on the current number of requests being handled by each cluster. Then the request is passed to a local load balancer 703 or 704 for the chosen cluster at step 712 or 713. When the local load balancer receives HTTP requests from the global load balancer, the local load balancer is responsible for balancing HTTP requests across servers 707 or 708 within the cluster at step 714 or 715.

In order to replicate session data from one cluster to another, a replication channel 710 can be configured to communicate session state information from the primary to the secondary cluster. A replication channel can be a network channel that is dedicated specifically to replication traffic between clusters. When a server within a cluster fails, the local load balancer is responsible for transferring the request to other servers within a cluster. When the entire cluster fails, the local load balancer returns HTTP requests back to the global load balancer. The global load balancer then redirects this request to the other local load balancer.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting lazy deserialization of session information in a server cluster, the system comprising:
   a server cluster executing on one or more microprocessors, wherein the server cluster includes a plurality of application server instances, wherein one or more of the plurality of application server instances are assigned to a preferred replication group;
   a web server and a proxy application running thereon, wherein the proxy application maintains information of the plurality of application server instances, and directs a request from a client to a particular application server instance, wherein the particular application server instance operates as a primary application server instance to
      store a session associated with the client, and
      select a secondary application server instance from the remaining application server instances in the server cluster, wherein the selection of the secondary application server instance is based at least on whether the secondary application server instance is in the preferred replication group that does not include the primary application server instance;

wherein the proxy application on the web server instructs the client to write a cookie configured to store location information of the primary application server instance and location information of the secondary application server instance;

wherein the secondary application server instance operates to store a serialized copy of the session in a byte array on the secondary application server instance, detect that one or more entries in the byte array are affected by a particular session update received from the primary application server instance, and, update the one or more affected entries in the byte array on the secondary application server instance;

wherein, in the event of a failure of the primary application server instance, the proxy application on the web server uses the location information stored in the cookie to locate the secondary application server instance, obtains a session state from the secondary application server instance through deserializing the updated serialized session, and responds to additional requests from the client based on the session state;

wherein the secondary application server instance subsequently operates as a new primary application server instance, and selects a new secondary application server instance from the plurality of application server instances in the server cluster; and wherein the proxy application on the web server updates the cookie with location information of the new primary application server and location information of the new secondary application server.

2. The system according to claim 1, wherein the secondary application server instance operates to prevent deserialization when the primary application server instance is alive.

3. The system according to claim 1 wherein the session information on the primary application server instance contains one or more instances of software objects.

4. The system according to claim 1, wherein the deserialized session information on the secondary application server replicates the session information on the primary application server instance.

5. The system according to claim 1, wherein the primary application server instance operates to send the one or more session updates to the secondary application server instance when the client changes one or more session states.

6. The system according to claim 1, wherein the client uses a replica-aware stub to invoke a method on the secondary application server instance.

7. The system according to claim 1, wherein the session information is associated with a session ID that is stored in the cookie.

8. A method for supporting lazy deserialization of session information in a server cluster, comprising:
configuring a server cluster that includes a plurality of application server instances, wherein one or more of the plurality of application server instances are assigned to a preferred replication group;
configuring a web server and a proxy application running thereon, wherein the proxy application maintains information of the plurality of application server instances, and directs a request from a client to a particular application server instance, wherein the particular application server instance operates as a primary application server instance to store a session associated with the client;
selecting, from the remaining application server instances in the server cluster, a secondary application server instance for storing a copy of the session received from the primary application server, based at least on whether the secondary application server instance is in the preferred replication group that does not include the primary application server instance,
wherein the secondary application server operates to store a serialized copy of the session received from the primary application server instance in a byte array on the secondary application server instance, detect that one or more entries in the byte array are affected by a particular session update received from the primary application server instance, and update the one or more affected entries in the byte array on the secondary application server instance; and
instructing, by the proxy application on the web server, the client to write a cookie configured to store location information of the primary application server instance and location information of the secondary application server instance;
detecting a failure of the primary application server instance by the proxy application on the web server; and
using the location information stored in the cookie to locate the secondary application server instance, obtains a session state from the secondary application server instance through deserializing the updated serialized session, and responds to additional requests from the client based on the session state;
wherein the secondary application server instance subsequently operates as a new primary application server instance, and selects a new secondary application server instance from the plurality of application server instances in the server cluster; and
wherein the proxy application on the web server updates the cookie with location information of the new primary application server and location information of the new secondary application server.

9. The method according to claim 8, wherein the secondary application server instance operates to prevent deserialization when the primary application server instance is alive.

10. The method according to claim 8, wherein the session information on the primary application server instance contains one or more instances of software objects.

11. The method according to claim 8, wherein the deserialized session information on the secondary application server replicates the session information on the primary application server instance.

12. The method according to claim 8, wherein the primary application server instance operates to send the one or more session updates to the secondary application server instance when the client changes one or more session states.

13. The method according to claim 8, wherein the client uses a replica-aware stub to invoke a method on the secondary application server instance.

14. The method according to claim 8, wherein the session information is associated with a session ID that is stored in the cookie.

15. A non-transitory computer readable storage medium including instructions stored thereon which, when executed by a computer, cause the computer to perform the steps comprising:

configuring a server cluster that includes a plurality of application server instances, wherein one or more of the plurality of application server instances are assigned to a preferred replication group;

configuring a web server and a proxy application running thereon, wherein the proxy application maintains information of the plurality of application server instances, and directs a request from a client to a particular application server instance, wherein the particular application server instance operates as a primary application server instance to store a session associated with the client;

selecting, from the remaining application server instances in the server cluster, a secondary application server instance for storing a copy of the session received from the primary application server, based at least on whether the secondary application server instance is in the preferred replication group that does not include the primary application server instance, wherein the secondary application server operates to
store a serialized copy of the session received from the primary application server instance in a byte array on the secondary application server instance,
detect that one or more entries in the byte array are affected by a particular session update received from the primary application server instance, and
update the one or more affected entries in the byte array on the secondary application server instance; and instructing, by the proxy application on the web server, the client to write a cookie configured to store location information of the primary application server instance and location information of the secondary application server instance;

detecting a failure of the primary application server instance by the proxy application on the web server; and using the location information stored in the cookie to locate the secondary application server instance, obtains a session state from the secondary application server instance through deserializing the updated serialized session, and responds to additional requests from the client based on the session state;

wherein the secondary application server instance subsequently operates as a new primary application server instance, and selects a new secondary application server instance from the plurality of application server instances in the server cluster; and wherein the proxy application on the web server updates the cookie with location information of the new primary application server and location information of the new secondary application server.

16. The non-transitory computer readable storage medium of claim 15, wherein the secondary application server instance operates to prevent deserialization when the primary application server instance is alive.

17. The non-transitory computer readable storage medium of claim 15, wherein the session information on the primary application server instance contains one or more instances of software objects.

18. The non-transitory computer readable storage medium of claim 15, wherein the primary application server instance operates to send the one or more session updates to the secondary application server instance when the client changes one or more session states.

19. The non-transitory computer readable storage medium of claim 15, wherein the client uses a replica-aware stub to invoke a method on the secondary application server instance.

20. The non-transitory computer readable storage medium of claim 15, wherein the session information is associated with a session ID that is stored in the cookie.

* * * * *

UNITED STATES PATENT AND TRADEMARK OFFICE
CERTIFICATE OF CORRECTION

| | |
|---|---|
| PATENT NO. | : 9,811,541 B2 |
| APPLICATION NO. | : 13/167636 |
| DATED | : November 7, 2017 |
| INVENTOR(S) | : Revanuru et al. |

It is certified that error appears in the above-identified patent and that said Letters Patent is hereby corrected as shown below:

On page 3, Column 1, under Other Publications, Line 22, after "European" insert -- Patent --.

In Column 1, Line 64, delete "InifiniBand" and insert -- InfiniBand --, therefor.

In Column 3, Line 9, delete "InifiniBand" and insert -- InfiniBand --, therefor.

Signed and Sealed this
Twelfth Day of June, 2018

Andrei Iancu
*Director of the United States Patent and Trademark Office*